(12) United States Patent
Bahal et al.

(10) Patent No.: US 12,743,365 B2
(45) Date of Patent: Sep. 22, 2026

(54) ACTIONS BY SENSORS AT DIFFERENT TIME OFFSETS

(71) Applicant: HEWLETT PACKARD ENTERPRISE DEVELOPMENT LP, Spring, TX (US)

(72) Inventors: Rahul Bahal, Santa Clara, CA (US); Derwin Thulani Ngomane, Cape Town (ZA); Laura Lee Richter, Cape Town (ZA)

(73) Assignee: Hewlett Packard Enterprise Development LP, Spring, TX (US)

( * ) Notice: Subject to any disclaimer, the term of this patent is extended or adjusted under 35 U.S.C. 154(b) by 546 days.

(21) Appl. No.: 18/452,599

(22) Filed: Aug. 21, 2023

(65) Prior Publication Data

US 2025/0068546 A1 Feb. 27, 2025

(51) Int. Cl.
*G06F 11/3668* (2025.01)
*G01D 21/00* (2006.01)

(52) U.S. Cl.
CPC ......... *G06F 11/3688* (2013.01); *G01D 21/00* (2013.01)

(58) Field of Classification Search
CPC ............................ G06F 11/3688; G01D 21/00
See application file for complete search history.

(56) References Cited

U.S. PATENT DOCUMENTS

2018/0188284 A1* 7/2018 Douglas ................. G06V 40/23
2021/0396845 A1* 12/2021 Marx .................... G01S 7/4815

FOREIGN PATENT DOCUMENTS

JP 2005135289 A * 5/2005 ........ H04W 52/0216

OTHER PUBLICATIONS

English machine translation of Isoyama et al. (JP 2005135289 A) (Year: 2005).*
Aruba, Tech Brief, Aruba User Experience Insight (UXI)—Sensors, 2022 (9 pages).
Ghogale, Mandar, Best Practice Design for Aruba User Experience Insight Deployment, Deployment guide for Aruba UXI sensors downloaded Jul. 18, 2023 (6 pages).
HPE Aruba Networking, Aruba User Experience Insight (UXI) Sensors downloaded Jul. 18, 2023 (8 pages).
Nick Kephart, “How Much Data is Enough? Tips on Selecting a Test Interval”, available online at <https://www.thousandeyes.com/blog/tips-selecting-test-interval>, Jan. 10, 2018, 6 pages.

* cited by examiner

*Primary Examiner* — Walter L Lindsay, Jr.
*Assistant Examiner* — Geoffrey T Evans
(74) *Attorney, Agent, or Firm* — Trop, Pruner & Hu, P.C.

(57) ABSTRACT

In some examples, different time offsets within a test time interval are computed for tests by respective sensors of a plurality of sensors, where a time offset of the different offsets indicates a point in time within the test time interval with respect to which a corresponding sensor is to initiate a test. A sensor of the plurality of sensors performs tests according to a corresponding time offset of the different time offsets.

18 Claims, 4 Drawing Sheets

ACTIONS BY SENSORS AT DIFFERENT TIME OFFSETS

BACKGROUND

A computing environment can include various electronic devices. As examples, computing environments can include computers (e.g., desktop computers, notebook computers, tablet computers, server computers, etc.), smartphones, communication nodes (e.g., routers, switches, gateways, etc.), storage systems, point-of-sale systems, industrial equipment, vehicles, or other types of electronic devices.

BRIEF DESCRIPTION OF THE DRAWINGS

Some implementations of the present disclosure are described with respect to the following figures.

Figure 1:
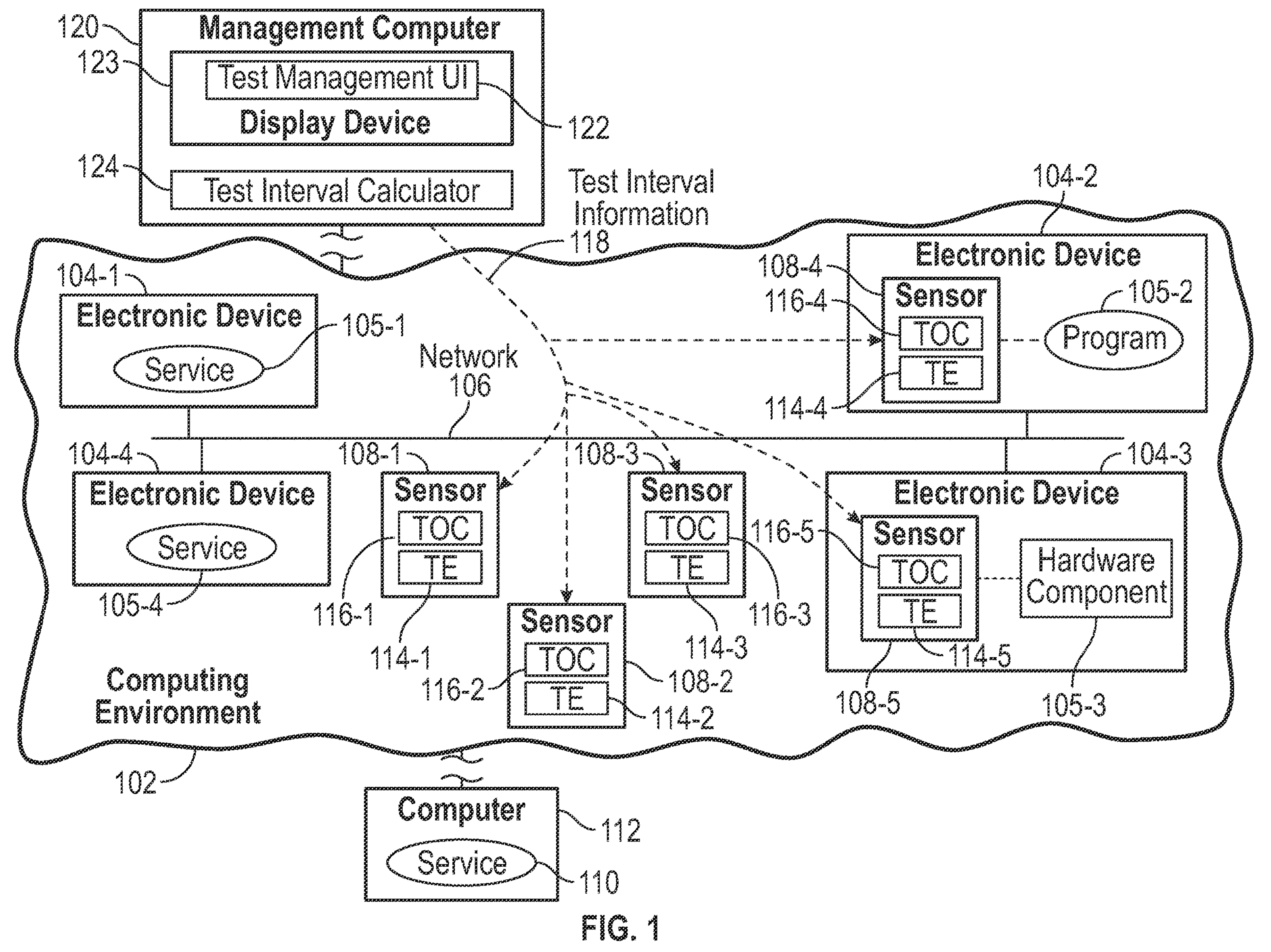
FIG. 1 is a block diagram of an arrangement including sensors for performing tests, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Tests are performed in a computing environment to check that various components of the computing environment and/or components outside the computing environment are operating according to target specifications or are not faulty. The tests can be performed using sensors deployed in the computing environment. The sensors can include hardware sensors, which can include hardware sensors external of electronic devices but coupled to the electronic devices, and/or hardware sensors included in the electronic devices. Sensors can also include software sensors, which are implemented using machine-readable instructions executed in electronic devices. Some sensors can be at fixed locations in the computing environment. Other sensors can be mobile sensors that can move around in the computing environment.

In a large computing environment, there can be a large quantity of sensors, such as hundreds or thousands of sensors (or even more sensors). A large quantity of sensors can potentially perform many tests in a short amount of time. Each test performed by a sensor can cause test data traffic to be communicated in a computing environment, such as over one or more networks of the computing environment. Test data traffic may also be directed at specific target electronic devices, such as web servers, database servers, point-of-sale systems, or other electronic devices.

A large amount of test data traffic can overwhelm a network or a target electronic device. A flood of test data traffic in a short period of time can result in a distributed denial of service (DDoS) event in which resources of the computing environment are inaccessible by entities, including users, programs, or machines.

In some examples, sensors can be configured with individual test rate limits. A test rate limit indicates a maximum frequency at which a sensor is able to perform tests. For example, the test rate limit can enforce a target time interval between tests. After performing a test, the sensor would wait the target time interval before performing another test. More generally, when configured with a test rate limit, a quantity of tests performed by a sensor per unit time is less than a target rate of tests.

Even when sensors are configured with individual test rate limits, there are times when the tests performed by a large quantity of sensors fall within a short amount of time. For example, an anomaly (e.g., network down, power loss, or another event causing resources to be unavailable or to perform at degraded levels) may occur in a computing environment that prevents (at least some) sensors from performing tests. When the computing environment recovers from the anomaly, many sensors may start tests again within a narrow time window. The tests within the narrow time window after recovery from the anomaly can overwhelm the computing environment.

In accordance with some implementations of the present disclosure, to avoid or reduce the likelihood of overloading a computing environment with a large quantity of tests by sensors, testing techniques or mechanisms compute different time offsets within a test time interval for different sensors. The time offsets determine when respective sensors are to perform tests within the test time interval. The test time interval is set to reduce the likelihood that a test rate performed by a fleet of sensors would exceed an upper test limit. A time offset indicates a point in time within the test time interval with respect to which a corresponding sensor is to initiate a test. By employing different time offsets within the test time interval for tests performed by different sensors, the tests can be arranged to be out of phase with respect to one another, which reduces the likelihood that tests by the different sensors become time synchronized after certain events, such as a recovery of a computing environment from an anomaly. The out-of-phase testing can be achieved without central control of the sensors. The sensors can independently check whether or not to perform corresponding tests on their respective time offsets. In this manner, a fleet-wide rate limit for the fleet of sensors can be enforced at an aggregate level based on independent operations of the sensors. Note that the time offsets determined for the sensors may all be different from each other. In other cases, it is possible that two or more of the fleet of sensors can use the same time offset, while other sensors of the fleet of sensors use different time offsets.

FIG. 1 is a block diagram of an example arrangement that includes a computing environment 102. The computing environment 102 includes electronic devices, such as electronic devices 104-1, 104-2, 104-3, and 104-4. The computing environment 102 includes a network 106 over which the electronic devices are able to communicate with one another and with other components.

Examples of electronic devices include computers, smartphones, communication nodes, storage systems, point-of-sale systems, industrial equipment, vehicles, or other types of electronic devices. A "computing environment" can refer to any environment in which electronic devices are able to communicate with one another. The computing environment can include sub-environments that are distributed across distant geographic locations, in some examples. In other examples, the computing environment can be deployed within a physical facility, such as an office, a home, a factory, or another physical environment.

The computing environment 102 further includes various sensors, such as sensors 108-1, 108-2, 108-3, 108-4, and 108-5. Although specific quantities of electronic devices and sensors are shown in FIG. 1, in other examples, different quantities of electronic devices and/or sensors can be present.

The sensors 108-1 to 108-3 are external of electronic devices. The sensor 108-4 is inside the electronic device 104-2, and the sensor 108-5 is inside the electronic device 104-3. As used here, a "sensor" can refer to an entity (implemented using hardware or a combination of hardware and machine-readable instructions) that is able to perform tests of one or more target components in the computing environment 102 and/or of one or more target components outside the computing environment 102. A "component" to be tested can include a hardware component or machine-readable instructions (e.g., software or firmware). For example, a sensor can perform a test of any of the electronic devices 104-1 to 104-4, including a test of a service 105-1 in the electronic device 104-1 and a service 105-4 in the electronic device 104-4. The sensor 108-4 in the electronic device 104-2 can perform a test of a program 105-2 in the electronic device 104-2. The sensor 108-5 in the electronic device 104-3 can perform a test of a hardware component 105-3 in the electronic device 104-3.

Alternatively, a sensor can perform a test of external components such as a service 110 running in a computer 112. The service 110 may include a database service, a web service, a social media service, or any other type of service. The computer 112 may be coupled to the computing environment 102 over an external network, such as the Internet or another type of network.

A sensor may be a fixed sensor that is located at a fixed physical location. Alternatively, a sensor may be a mobile sensor that can move around the computing environment while performing tests as the mobile sensor moves. The sensors 108-1 to 108-3 may be connected to the network 106 to communicate with target components to be tested. The network 106 may include a wired network and/or a wireless network. Alternatively, one or more of the sensors 108-1 to 108-3 may be connected directly to a target component to be tested over a wired or wireless link.

Each sensor includes a respective test engine (TE) that is able to initiate a test of a target component (or more generally, of a collection of target components, where a collection of target components can include a single component or multiple components). The sensors 108-1 to 108-5 include respective test engines 114-1 to 114-5. A test engine can be implemented using the hardware processing circuit of the sensor or as machine-readable instructions executable by the sensor.

Examples of tests that can be performed by test engines can include any or some combination of the following: a Hypertext Transfer Protocol (HTTP) test that involves sending one or more HTTP requests to a target component and receiving HTTP responses; a Hypertext Transfer Protocol Secure (HTTPS) test that involves sending one or more HTTP requests with encryption and verification, and receiving HTTP responses with encryption and verification; an Internet Control Message Protocol (ICMP) test that sends ICMP pings for diagnosing network communication issues; a Transmission Control Protocol (TCP) test to test a TCP connection; a throughput-based test to test a throughput of a network; a web application test to test a web application program; a Voice-over-Internet protocol (VOIP) test to test VOIP communications; or any other types of tests.

In accordance with some implementations of the present disclosure, each sensor may also include a test offset calculator (TOC) to compute a time offset within a test time interval at which the respective test engine of the sensor is to initiate a test. The sensors 108-1 to 108-5 include respective TOCs 116-1 to 116-5. The TOC can be implemented using a portion of the hardware processing circuitry of the sensor or with machine-readable instructions executed by the sensor. In other examples, as explained further below, the TOCs may be omitted from the sensors 108-1 to 108-5.

Different TOCs in different sensors can compute different time offsets within the test time interval. Note that the time offsets can be randomized time offsets derived using random numbers by the sensors. For example, a TOC computes a fraction of the test time interval, where the fraction is set based on a random number produced by a random number generator. Different random numbers correspond to different fractions. For example, a mapping table can be used by the TOC to map different random numbers to different fractions. Alternatively, a formula can be used to generate a fraction based on an input random number. The computed fraction of the test time interval is converted to a time offset relative to the start of the test time interval. For example, if the test time interval is 100 minutes (mins), and the computed fraction is 12%, then the time offset for 12% is 12 mins from the start of the 100-minute test time interval.

In other examples, the time offsets do not have to be randomized time offsets and can be derived using other techniques to achieve a fleet-wide rate limit or another goal. For example, the time offsets can be based on an arbitrary time offset value selection, or based on selection from a distribution of time offset values, and so forth, so long as the selected time offsets are sufficiently distributed to achieve the target goal, e.g., a fleet-wide rate limit.

Each TOC receives test interval information 118 from a management computer 120, which can be coupled to the computing environment 102 (such as over a network) or can be within the computing environment 102. The management computer 120 includes a test management user interface (UI) 122 that is displayed by a display device 123. A user can use the test management UI 122 to specify various test parameters to be used by a test interval calculator 124 running in the management computer 120 to compute a test time interval. The test interval calculator 124 can be implemented using machine-readable instructions executed by the management computer 120, for example. Alternatively, the test interval calculator 124 can be implemented using hardware.

Once the test time interval is computed, the test interval calculator 124 sends test interval information 118 that defines the test time interval (e.g., a length of the test time interval) to the sensors of the computing environment 102.

In other examples, instead of including TOCs 116-1 to 116-5 in the sensors 108-1 to 108-5, the management computer 120 can compute the time offsets. In such latter examples, the management computer 120 can send the computed time offsets to the sensors 108-1 to 108-5. For example, the time offsets computed by the management computer 120 can be included in the test interval information 118.

In further examples, the sensors 108-1 to 108-5 can perform other types of actions (different from tests) at respective different time offsets in the test time interval. Examples of such other actions (referred to as "non-test actions") include any or some combination of the following:

issuing a command from a sensor to perform a requested operation (e.g., data gathering such as to gather performance metrics, gather utilization metrics of a resource including a hardware resource and/or a software resource, or gathering of other types of data); transmitting messages to neighboring devices in a network; actions that consume network bandwidth; or other types of actions.

Figure 2:
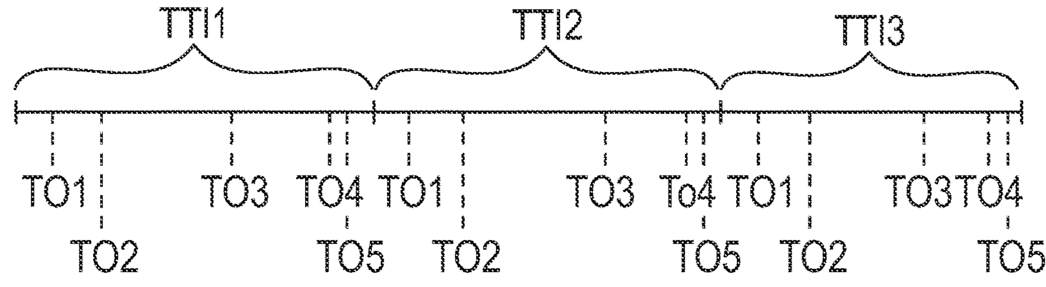
FIG. 2 is a schematic diagram of test time intervals determined according to some examples.

FIG. 2 shows an example with three test time intervals (TTI1, TTI2, and TTI3). Each test time interval TTI1, TTI2, and TTI3 has the same time length. Within each test time interval, a respective sensor is to perform a corresponding test at or near a corresponding time offset (represented as TOx, where x=1 to 5). More specifically, a sensor uses the corresponding time offset to determine whether a condition is satisfied at a current time within a test time interval, and if so, to initiate a test at the current time. The condition that is checked is discussed as "Condition 1" further below.

The test engine 114-1 in the sensor 108-1 initiates a test at or near time offset TO1 in each of TTI1, TTI2, or TTI3. Similarly, the test engine 114-2 initiates a test at or near time offset TO2 in each of TTI1, TTI2, or TTI3, the test engine 114-3 initiates a test at or near time offset TO3 in each of TTI1, TTI2, or TTI3, the test engine 114-4 initiates a test at or near time offset TO4 in each of TTI1, TTI2, or TTI3, and the test engine 114-5 initiates a test at or near time offset TO5 in each of TTI1, TTI2, or TTI3.

Figure 3:
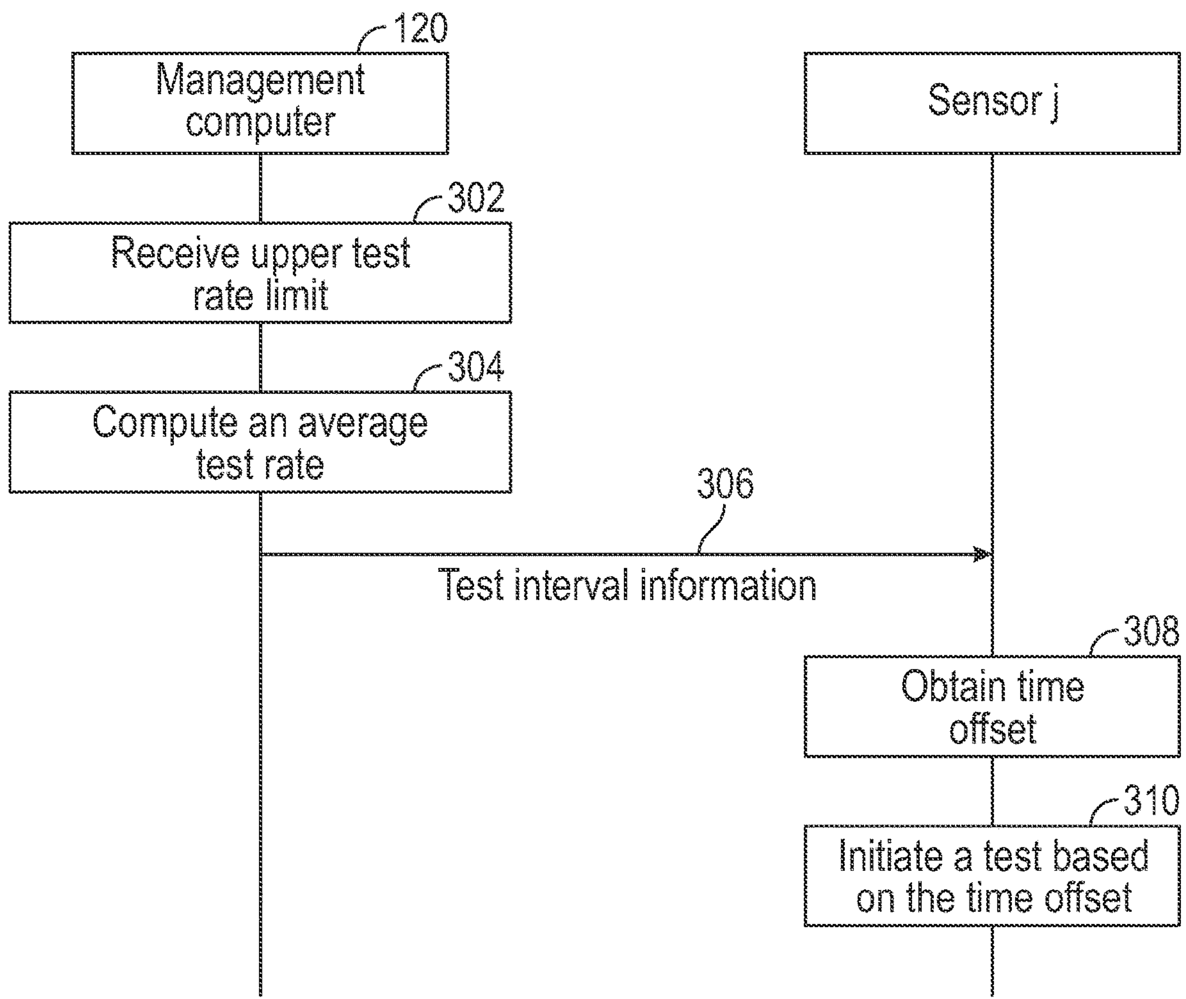
FIG. 3 and FIG. 4 are flow diagrams of testing processes according to some examples.

FIG. 3 is a flow diagram of an example process associated with testing performed by a fleet of sensors (e.g., 108-1 to 108-5) of the computing environment 102. Using the test management UI 122, a user can set an upper test rate limit (R_upper) for the sensors of the computing environment 102. As an example, the test rate limit (R_upper) can be expressed as Y quantity of tests per unit time (e.g., 500 tests per minute, 1000 tests per minute, 10 tests per second, etc.). The test interval calculator 124 in the management computer 120 receives (at 302) the upper test rate limit (R_upper), which was entered by the user in the test management UI 122. In other examples, instead of the user providing the upper test rate limit (R_upper), the upper test rate limit (R_upper) can be set by a program or a machine.

The test interval calculator 124 computes (at 304) an average test rate (R_avg) to target across the fleet of sensors for a given confidence level for staying below the upper test rate limit (R_upper). For example, the given confidence level can be 99.9%, which means that given a distribution of test rates of tests performed by the fleet of sensors it is expected that 1 in 1,000 of the test rates would exceed the upper test rate limit (R_upper). In other examples, a different confidence level that can be set by a user, a program, or machine.

The test interval calculator 124 can use an approximate analytical expression to derive the average test rate (R_avg). For example, the approximate analytical expression can assume a Poisson distribution of test rates performed by the fleet of sensors.

In some examples, the average test rate (R_avg) can be derived using:

$$\text{R\_avg} + z \cdot \sigma = \text{R\_upper}, \quad \text{(Eq. 1)}$$

where σ represents the standard deviation of the distribution of test rates, and z is a constant value that is defined for a target confidence level. For example, z=3.09023 for a 99.9% confidence level.

With a Poisson distribution, mean is equal to variance. As a result, $$\sigma = \sqrt{\text{R\_avg}}.$$

Eq. 1 can be rewritten as:

$$\text{R\_avg} + z \cdot \sqrt{\text{R\_avg}} = \text{R\_upper}. \quad \text{(Eq. 2)}$$

Eq. 2 can be solved analytically to give:

$$\text{R\_avg} = \text{R\_upper} + \frac{z^2}{2} - \sqrt{\text{R\_upper} \cdot z^2 + \frac{z^4}{2}}. \quad \text{(Eq. 3)}$$

Although the above provides an example of how R_avg is computed, in other examples, a different technique for computing R_avg can be employed.

Given the quantity of sensors (in the fleet of sensors) that are to perform tests, the test interval calculator 124 derives the test time interval that will produce the average test rate (R_avg) across the fleet of sensors.

As an example, assume R_upper is set at 80 tests per minute. Using Eq. 3, R_avg is computed as 56.322 tests per minute. Assuming that the quantity of the fleet of sensors (n_sensors) is 1,000, then the test rate (sensor_rate) at which each individual sensor of the n_sensors=1,000 sensors is to perform tests to achieve R_avg is computed as follows:

$$\text{sensor\_rate} = \frac{\text{R\_avg}}{\text{n\_sensors}}, \quad \text{(Eq. 4)}$$

Given the test rate (sensor_rate), the test time interval (test_time_interval) within which tests are to be performed by the fleet of sensors is given by:

$$\text{test\_time\_interval} = \frac{1}{\text{sensor\_rate}}. \quad \text{(Eq. 5)}$$

All of the sensors of the fleet of sensors are to perform their tests in the test time interval. In other words, if there are 1,000 sensors, then within any given test time interval (e.g., any of TTI1, TTI2, or TTI3 in FIG. 2), each of the 1,000 sensors performs a test in the given test time interval.

In the above example where R_avg is 56.322 and n_sensors is 1,000, $$\text{sensor\_rate} = \frac{56.322}{1{,}000}.$$

In this example, the test time interval (test_time_interval) is computed as:

$$\text{test\_time\_interval} = \frac{1}{\frac{56.322}{1{,}000}} = 17.755 \text{ mins.}$$

As the sensor configuration changes (e.g., the quantity of sensors changes such that the number of sensors increases or decreases), the test interval calculator 124 can re-compute the test time interval and send updated test interval information 118 to the sensors.

Each sensor j (of the fleet of sensors) receives (at 306), from the management computer 120, the test interval information 118 and uses the test time interval represented by the test interval information 118 to determine a time offset TOj to be used by sensor j. In the example of FIG. 1, there are five sensors 108-1 to 108-5, so j=1 to 5. The test interval information 118 can define the length of the test time interval. In some examples, sensor j can compute the time offset TOj (e.g., by the respective TOC 116-*j*) based on the test time interval specified by the test interval information 118. In a different example, the management computer 120 can compute the time offset TOj for sensor j (as well as for all other sensors), and the management computer sends the time offset TOj to the sensor j. In an example, the time offset TOj can be specified in the test interval information 118 sent from the management computer 120 to sensor j.

Each sensor j performs the following tasks in response to receiving the test interval information 118. Sensor j obtains (at 308) the time offset TOj that is to be used by sensor j to initiate a test. In some examples, sensor j can obtain the time offset TOj by computing the time offset TOj. In other examples, sensor j can obtain the time offset TOj by receiving the time offset TOj from the management computer 120.

In an example, sensor j is to perform a collection of tests by selecting the tests in a round-robin manner. For example, in a first test time interval, sensor j selects a first test from the collection of tests, in a second test time interval, sensor j selects a second test from the collection of tests, and so forth. A test time interval within which sensor j performs a round-robin selection of a test can be referred to as a round-robin test cycle. Within a current test time interval, sensor j initiates (at 310) a selected test based on time offset TOj.

The following describes an example of how sensor j uses time offset TOj to determine whether sensor j is to initiate a test at a current time t within a test time interval. Specifically, sensor j determines if the following condition is satisfied:

$$(t - TOj)\%\ \text{test\_time\_interval} < \text{sensor\_cycle\_time}, \qquad \text{(Condition 1)}$$

where % is a modulo operator, and sensor_cycle_time represents a cycle time for sensor j to cycle through all tests of the collection of tests to be performed by sensor j. The cycle time (sensor_cycle_time) can be calculated by sensor j based on the median (or alternatively, the average, the sum, or another aggregate) of the last M (M≥1) cycle times for sensor j.

Condition 1 is based on whether a value derived from a difference between the current time and a sensor's time offset is less than a cycle time of the sensor. In some examples, the value is derived based on computing the difference modulo a length of the test time interval.

If Condition 1 is satisfied at the current time t, then sensor j initiates a test selected from its collection of tests. If Condition 1 is not satisfied at the current time t, then sensor j does not initiate any test at the current time t.

The following provides a specific example for sensor j, assuming a test time interval of 17.755 mins. Assume further that the time offset TOj between 0 and 17.755 mins is 14 mins. In this example, the cycle time (sensor_cycle_time) of sensor j is assumed to be approximately 3 mins, which means that sensor j cycles through all tests of sensor j's collection of tests in approximately 3 mins. Note that it is possible that some tests take longer or shorter than other tests by sensor j, so the cycle time of sensor j may not be exactly 3 mins.

If the current time is 1688212800 Unix seconds (representing 2 pm UTC on Jul. 1, 2023, for example), sensor j performs a check of Condition 1 as follows:

$$(t - TOj)\%\ \text{test\_time\_interval} < \text{sensor\_cycle\_time},$$

which in the example is $$(1688212800 - 14\ \text{mins}\cdot 60)\%17.755\ \text{mins} = 14.260\ \text{mins}.$$

Note that 14.260 mins is greater than 3 mins, which is the approximate cycle time (sensor_cycle_time) of sensor j. Since Condition 1 is not satisfied, at the current time t=1688212800 seconds, sensor j does not initiate any test.

Sensor j will repeat the test for Condition 1 in 3 mins (sensor j's approximate cycle time) from the current time, as follows:

$$((1688212800 + 3\cdot 60) - 14\ \text{mins}\cdot 60)\%17.755\ \text{mins} = 16.710\ \text{mins}.$$

Note that 16.710 mins is greater than 3 mins, which is the approximate cycle time (sensor_cycle_time) of sensor j. Since Condition 1 is not satisfied, at the current time t=(1688212800+3·60) seconds, sensor j does not initiate any test.

Sensor j will repeat the test for Condition 1 in another 3 mins from the current time t=(1688212800+3·60), as follows:

$$((1688212800 + 3\cdot 60 + 3\cdot 60) - 14\ \text{mins}\cdot 60)\%17.755\ \text{mins} = 1.405\ \text{mins}.$$

Note that 1.405 mins is less than 3 mins, which is the approximate cycle time (sensor_cycle_time) of sensor j. Since Condition 1 is satisfied, at the current time t=(1688212800+3·60+3·60) seconds, sensor j initiates a test selected from sensor j's collection of tests.

Effectively, sensor j checks to determine if a current test cycle (at the current time t) is sufficiently close (based on Condition 1 being satisfied) to the periodic test time interval for time offset TOj, and if so, sensor j initiates a test. Stated differently, sensor j checks to determine whether a current time within a test time interval is within a threshold (determined based on Condition 1) of the time offset TOj for sensor j.

Although all sensors of the fleet of sensors have a target of performing a test every 17.755 mins (or more generally, once every test_time_interval), the tests performed by the sensors are out of phase with one another in the test time interval due to use of different time offsets by the sensors. The sensors in the fleet of sensors are able to perform tests at selected times independently of one another, while still avoiding or reducing the likelihood that the sensors become time synchronized when performing tests after the occurrence of an anomaly or another event. The ability to perform tests out of phase with respect to one another reduces peak testing load on a computing environment. The out-of-phase testing can be accomplished without using central control of the sensors (e.g., without using a central controller that manages when each sensor of the fleet of sensors is to perform a respective test).

Figure 4:
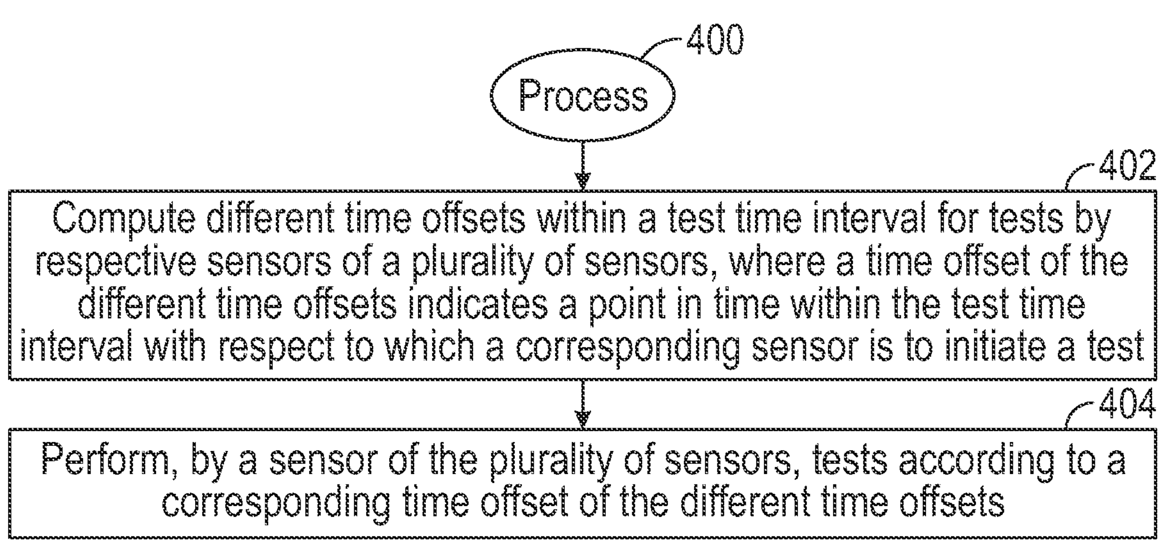

FIG. 4 is a flow diagram of a process 400 according to some examples. The process 400 includes computing (at 402) different time offsets within a test time interval for tests by respective sensors of a plurality of sensors, where a time offset of the different time offsets indicates a point in time within the test time interval with respect to which a corresponding sensor is to initiate a test. In some examples, the time offsets are computed by a management computer (e.g., 120 in FIG. 1) and sent by the management computer to the plurality of sensors. In other examples, the plurality of sensors compute respective time offsets of the different time offsets.

The process 400 includes performing (at 404), by a sensor of the plurality of sensors, tests according to a corresponding time offset of the different time offsets. In some examples, a first time offset within the test time interval at which a first sensor of the plurality of sensors performs a test in a computing environment is different from a second time offset within the test time interval at which a second sensor of the plurality of sensors performs a test in the computing environment. In some examples, it is possible that a third sensor of the plurality of sensors uses the same time offset as the first sensor or the second sensor.

In some examples, the first sensor selects, based on the first time offset, a test from a first collection of tests to perform at a first time point in the test time interval, and the second sensor selects, based on the second time offset, a test from a second collection of tests to perform at a second time point in the test time interval.

In some examples, the selecting of the test from the first collection of tests is a round robin selection of the test from the first collection of tests, and the selecting of the test from the second collection is a round robin selection of the test from the second collection of tests.

In some examples, the first sensor checks whether a condition based on the first time offset is satisfied at a current time within the test time interval, and the first sensor initiates a test in response to the condition being satisfied.

In some examples, the condition is based on whether a value derived from a difference between the current time and the first time offset is less than a cycle time of the first sensor. In some examples, the cycle time of the first sensor is based on an aggregate of lengths of test cycles to perform tests by the first sensor.

In some examples, the different time offsets are random time offsets.

Figure 5:
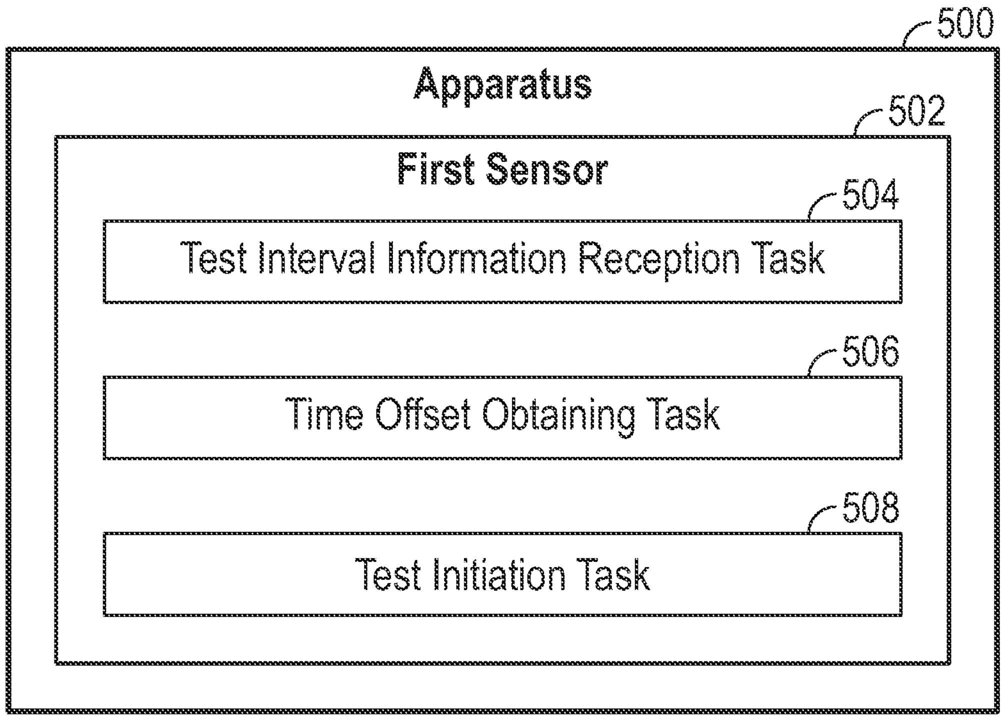
FIG. 5 is a block diagram of an apparatus according to some examples.

FIG. 5 is a block diagram of an apparatus 500 according to some examples. The apparatus 500 can include one or more sensors, for example. A first sensor 502 in the apparatus 500 performs the following tasks. The tasks can be performed by one or more hardware processing circuits, or by machine-readable instructions. The tasks include a test interval information reception task 504 to receive, from a computer system (e.g., the management computer 120 of FIG. 1), information of a test time interval (e.g., 118 of FIG. 1) for tests by respective sensors of a plurality of sensors in a computing environment.

The tasks include a time offset obtaining task 506 to obtain a first time offset that indicates a point in time within the test time interval with respect to which the first sensor is to initiate a test in the computing environment. The first time offset for the first sensor is different from a second time offset within the test time interval for a second sensor of the plurality of sensors.

The tasks include a test initiation task 508 to initiate tests according to the first time offset in respective cycles of the test time interval. Each cycle of the test time interval refers to an instance of the test time interval. For example, FIG. 2 shows three cycles (instances) TTI1, TTI2, and TTI3 of the test time interval.

Figure 6:
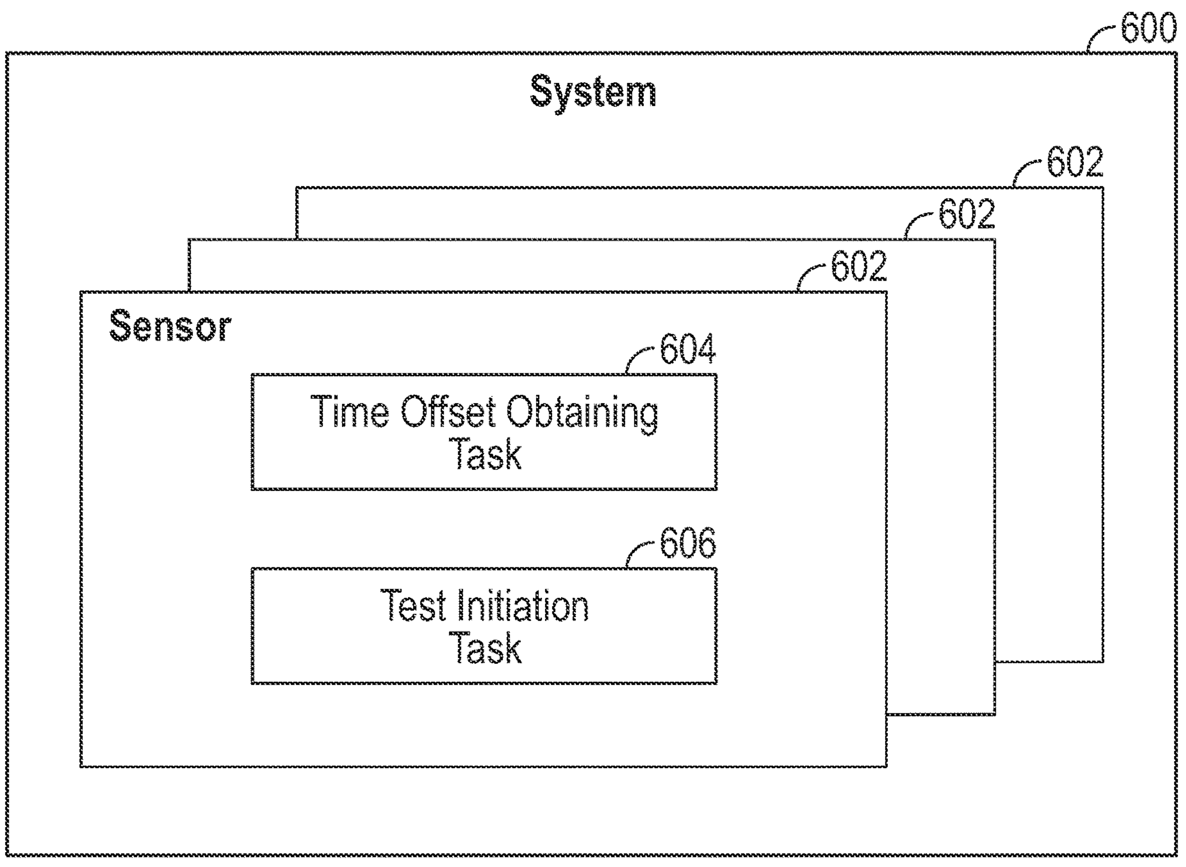
FIG. 6 is a block diagram of a system according to some examples.

FIG. 6 is a block diagram of a system 600 according to some examples. The system 600 can include the computing environment 102 of FIG. 1, for example. The system 600 includes a plurality of sensors 602 to test target components within or outside a computing environment. The plurality of sensors 602 perform the following tasks. The tasks of the plurality of sensors 602 include a time offset obtaining task 604 to obtain different time offsets within a test time interval for tests by respective sensors of the plurality of sensors. A time offset of the different offsets indicates a point in time within the test time interval with respect to which a corresponding sensor is to initiate a test.

The tasks of the plurality of sensors 602 include a test initiation task 606 to initiate, by each sensor of the plurality of sensors, tests at time points in corresponding cycles of the test time interval based on a respective time offset of the different time offsets.

In examples where tasks discussed herein are performed by machine-readable instructions, the machine-readable instructions are stored in a storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:

computing different time offsets within a test time interval for tests by respective sensors of a plurality of sensors, wherein a time offset of the different time offsets indicates a point in time within the test time interval with respect to which a corresponding sensor is to initiate a test;

performing, by a sensor of the plurality of sensors, tests according to a corresponding time offset of the different time offsets, wherein a first time offset within the test time interval at which a first sensor of the plurality of sensors performs a test in a computing environment is different from a second time offset within the test time interval at which a second sensor of the plurality of sensors performs a test in the computing environment;

selecting, by the first sensor based on the first time offset, a test from a first collection of tests to perform at a first time point in the test time interval; and selecting, by the second sensor based on the second time offset, a test from a second collection of tests to perform at a second time point in the test time interval.

2. The method of claim 1, wherein the selecting of the test from the first collection of tests is a round robin selection of the test from the first collection of tests, and the selecting of the test from the second collection is a round robin selection of the test from the second collection of tests.

3. The method of claim 1, comprising:

checking, by the first sensor, whether a condition based on the first time offset is satisfied at a current time within the test time interval; and initiating a test by the first sensor in response to the condition being satisfied.

4. The method of claim 3, wherein the condition is based on whether a value derived from a difference between the current time and the first time offset is less than a cycle time of the first sensor, and wherein the cycle time of the first sensor is based on an aggregate of lengths of test cycles to perform tests of the first collection of tests by the first sensor.

5. The method of claim 1, further comprising:

performing, by the plurality of sensors, non-test actions at corresponding time offsets within the test time interval.

6. The method of claim 1, wherein the different time offsets are random time offsets.

7. The method of claim 1, further comprising:

receiving, by the plurality of sensors from a management computer, information representing the test time interval computed by the management computer based on an upper test rate limit at which the tests are to be performed by the plurality of sensors in the computing environment.

8. The method of claim 7, wherein the test time interval is derived from an average test rate limit based on the upper test rate limit.

9. The method of claim 7, further comprising:

receiving, by the plurality of sensors from the management computer, further information representing an updated test time interval derived by the management computer in response to a configuration change of the computing environment.

10. The method of claim 1, wherein the computing of a time offset of the different time offsets is performed by a sensor of the plurality of sensors.

11. The method of claim 1, wherein the computing of the different time offsets is performed by a management computer, the method further comprising:

sending, by the management computer, the different time offsets to the respective sensors.

12. A system comprising:

a plurality of sensors to receive, from a computer system, information of a test time interval for tests by respective sensors of the plurality of sensors in a computing environment, a first sensor of the plurality of sensors to:

obtain a first time offset that indicates a point in time within the test time interval with respect to which the first sensor is to initiate a test in the computing environment, select a first test from a first collection of tests to perform at a first time point based on the first time offset in the test time interval, and initiate the first test at the first time point in the test time interval, a second sensor of the plurality of sensors to:

obtain a second time offset that indicates a point in time within the test time interval with respect to which the second sensor is to initiate a test in the computing environment, wherein the first time offset within the test time interval for the first sensor is different from the second time offset within the test time interval for the second sensor, select a second test from a second collection of tests to perform at a second time point based on the second time offset in the test time interval, and initiate the second test at the second time point in the test time interval.

13. The system of claim 12, wherein the first sensor is to:

check whether a condition based on the first time offset is satisfied at a current time within the test time interval; and initiate the first test by the first sensor in response to the condition being satisfied.

14. The system of claim 13, wherein the condition is based on whether a value derived from a difference between the current time and the first time offset is less than a cycle time of the first sensor.

15. The system of claim 14, wherein the value is derived based on computing the difference modulo a length of the test time interval.

16. The system of claim 12, wherein the first time offset is based on a random number.

17. A system comprising:

a plurality of sensors to test target components within or outside a computing environment, wherein the plurality of sensors are to:

obtain different time offsets within a test time interval for tests by respective sensors of the plurality of sensors, wherein a time offset of the different time offsets indicates a point in time within the test time interval with respect to which a corresponding sensor is to initiate a test;

initiate, by each sensor of the plurality of sensors, tests at time points based on a respective time offset of the different time offsets;

receive, at the plurality of sensors from a management computer, information representing the test time interval computed by the management computer based on an upper test rate limit at which the tests are to be performed by the plurality of sensors in the computing environment; and receive, at the plurality of sensors from the management computer, further information representing an updated test time interval derived by the management computer in response to a configuration change of the computing environment.

18. The system of claim 17, wherein the plurality of sensors are to obtain the different time offsets by one of:

receiving the different time offsets from the management computer, or computing the different time offsets.

* * * * *